United States Patent
Ogata et al.

(10) Patent No.: US 10,479,902 B2
(45) Date of Patent: *Nov. 19, 2019

(54) DURABLE AND FLEXIBLE INK COMPOSITION FOR HIGH-QUALITY/HIGH-DEFINITION SCREEN PRINTING, PRINTED PRODUCT OBTAINED BY SCREEN PRINTING SAID INK COMPOSITION, AND MANUFACTURING METHOD FOR SAID PRINTED PRODUCT

(71) Applicant: Teikoku Printing Inks Mfg. Co., Ltd., Tokyo (JP)

(72) Inventors: Tomomi Ogata, Tokyo (JP); Takuya Torihata, Tokyo (JP); Naoto Takada, Tokyo (JP)

(73) Assignee: TEIKOKU PRINTING INKS MFG. CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/302,289

(22) PCT Filed: Jan. 26, 2016

(86) PCT No.: PCT/JP2016/052095
§ 371 (c)(1),
(2) Date: Oct. 6, 2016

(87) PCT Pub. No.: WO2016/121726
PCT Pub. Date: Aug. 4, 2016

(65) Prior Publication Data
US 2017/0320345 A1    Nov. 9, 2017

(30) Foreign Application Priority Data
Jan. 27, 2015   (JP) ................................ 2015-013207

(51) Int. Cl.
| | | |
|---|---|---|
| *C09D 11/033* | (2014.01) | |
| *C09D 11/03* | (2014.01) | |
| *C09D 11/10* | (2014.01) | |
| *C09D 11/037* | (2014.01) | |
| *C09D 11/102* | (2014.01) | |
| *C09D 11/104* | (2014.01) | |
| *C09D 11/106* | (2014.01) | |
| *C09D 11/107* | (2014.01) | |
| *C09D 11/52* | (2014.01) | |
| *B41M 1/12* | (2006.01) | |
| *B41M 1/26* | (2006.01) | |
| *B41M 1/30* | (2006.01) | |
| *B41M 1/34* | (2006.01) | |
| *B41F 15/00* | (2006.01) | |

(52) U.S. Cl.
CPC ............ *C09D 11/033* (2013.01); *B41F 15/00* (2013.01); *B41M 1/12* (2013.01); *B41M 1/26* (2013.01); *B41M 1/30* (2013.01); *B41M 1/34* (2013.01); *C09D 11/03* (2013.01); *C09D 11/037* (2013.01); *C09D 11/10* (2013.01); *C09D 11/102* (2013.01); *C09D 11/104* (2013.01); *C09D 11/106* (2013.01); *C09D 11/107* (2013.01); *C09D 11/52* (2013.01)

(58) Field of Classification Search
None
See application file for complete search history.

(56) References Cited

U.S. PATENT DOCUMENTS 9,879,145 B2 * 1/2018 Ogata ..................... B41M 1/12

FOREIGN PATENT DOCUMENTS

| JP | 2003-238876 A | 8/2003 |
|---|---|---|
| JP | 2003-281936 A | 10/2003 |
| JP | 2005-314632 A | 10/2005 |
| JP | 2007-107057 A | 4/2007 |
| JP | 2003-294930 A | 2/2009 |
| JP | 2009-030065 A | 2/2009 |
| JP | 2010-47649 A | 3/2010 |
| JP | 2010-47716 A | 3/2010 |
| JP | 2010047649 A * | 3/2010 |
| JP | 2012-17411 A | 1/2012 |

OTHER PUBLICATIONS

Oct. 5, 2018 Office Action issued in U.S. Appl. No. 15/302,131.
Jan. 30, 2019 Office Action issued in U.S. Appl. No. 15/302,131.

* cited by examiner

Primary Examiner — Joshua D Zimmerman
(74) Attorney, Agent, or Firm — Oliff PLC

(57) ABSTRACT

An ink composition for screen printing having a measured flow radius value 13.0 to 24.0 mm after 1 minute from the start of measurement by a flow property measuring method using a spread meter at 25° C. according to JIS K5701-1: 2000, "F60"–"F45"≤1.0 mm is satisfied, wherein "F60" and "F45" are defined as measured flow radius values after 1 minute and 45 seconds, respectively, from the start of measurement by the flow property measuring method, the viscosity is 5 to 180 Pa·s, the thixotropic index is 2.0 to 8.0, the composition contains a solvent with a boiling point at least 170° C. at least at 70 mass % and a thermoplastic polymer with a weight-average molecular weight of at least 4000 and with a Tg of 20 to 95° C. at least at 10 mass %, wherein the printed image coating film has an elongation percentage at least 250%.

12 Claims, No Drawings

DURABLE AND FLEXIBLE INK COMPOSITION FOR HIGH-QUALITY/HIGH-DEFINITION SCREEN PRINTING, PRINTED PRODUCT OBTAINED BY SCREEN PRINTING SAID INK COMPOSITION, AND MANUFACTURING METHOD FOR SAID PRINTED PRODUCT

TECHNICAL FIELD

The present invention relates to an ink composition for high-quality/high-definition screen printing with flexibility and durability that is widely used for image pattern formation in the field of graphics and the field of display panel name plates, or in fields related to electric and electronic parts, and particularly that can print image coating films having excellent flexibility and durability onto printed matter that is to be shape-worked into three-dimensional shapes in post-working of the decorative printed matter for use as display panel parts or package parts, and also that allows high-precision printing of fine patterns such as fine dot patterns and fine line patterns, as well as wide-area solid patterns, by the screen printing simultaneously in a single step, and relates to printed matter produced by the screen printing ink composition and relates to a method for producing the printed matter.

BACKGROUND ART

In recent years, in fields relating to graphic decorative printed matter such as vehicle interior device control panels, household electrical appliance labels and designs on tablet device frames and enclosures, demands are increasing for more convenient and low-cost production of printed matter with greater diversity of design and increasingly high definition, having both fine patterns (for example, dot patterns with diameters of about 100 μm, or fine line patterns), and wide-area solid patterns. It is requested to attain higher quality and higher definition of the visibility of printed images that comprise both fine patterns and solid patterns, by improving the sharpness of the image edge sections in solid patterns while also obtaining a satisfactory leveling property.

Moreover, in the fields of black stripe or black matrix printing, as a type of graphics decoration in electric or electronic fields, there is a demand for obtaining a high degree of definition that provides sharpness to the printed images without bleeding or spreading, in addition to stable printing of fine lines, and it is desired to accomplish high definition printing with satisfactory visibility in a single step regardless of the size of the printed area, for cost reduction.

Also recently, with advancing diversity of product shapes, and especially for printed matter printed on thermoplastic resin substrates such as plastic, it has become common to carry out three-dimensional shape molding by post-working such as curving, folding, or vacuum forming or pressure forming.

For this reason, it is desired to accomplish an even greater level of precision of printed matter before shape working, or in other words need for increased high quality and high definition, and there is a strong desire for an ink for screen printing that can produce printed matter having both durability and flexibility in order to follow shape working.

In conventional screen printing, when printing a dot pattern or fine line pattern of approximately 100 μm, printing is usually performed using a high-viscosity screen printing ink of about 10 to 200 Pa·s, with a reduced flow property, but printing of solid patterns with such high-viscosity screen printing inks cannot avoid creation of leveling defects or printing abnormalities in the solid patterns due to the poor flow property, and as a result the visibility of the printed matter is impaired. Furthermore, when a low-viscosity screen printing ink of several Pa·s is used for satisfactory printing of solid patterns, it has been impossible to avoid spreading of ink that may exceed about 50 to 100 μm at the solid pattern image edge sections, or enlargement, spreading or bleeding of fine patterns, that impair the visibility of the printed matter. Thus, screen printing of fine patterns and solid patterns is performed separately with different inks suitably prepared for each, and it has been considered difficult to produce printed matter by screen printing of a single step comprising both the fine patterns and solid patterns mentioned above, as well as, for example, solid patterns with sizes of about 100 mm-square that are adjacent across fine spacings of about 100 μm.

In addition, it has been considered even more difficult to impart performance for shape working to such inks for screen printing that can produce high quality and high-definition printed matter in a single step.

Here, ink jet printing is considered to allow high-precision printing of printed matter comprising both fine patterns and solid patterns in a single step, and many attempts have been made to accomplish high-quality/high-definition printing by ink jet printing, however, since ink jet printing involves spraying ink droplets from a head nozzle with a diameter of about 30 μm, which spread out to about 50 μm at minimum when the droplets impact with the object being printed, it has been the case that such printing lacks sharp linearity especially at image edge sections.

Furthermore, inks for ink jet printing is requested to have low viscosity of about a few mPa·s due to the printing mechanism that injects droplets as described above, while major restrictions on the materials remain for using such inks, and fatal difficulties regarding the materials remain for imparting suitability for shape processing with excellent durability and flexibility.

In addition, offset printing is estimated to be a printing system that allows creation of high-quality/high-definition printed matter. However, since the structure of the printing plate is mesh-state, resulting in the printed images that are aggregated prints of halftone dots, it is impossible to avoid a lack of sharp linearity at image edge sections as is the case of ink jet printing. In addition, the printing film thickness is narrow at about 1 to 2 μm, and when compared with screen printed matter, they are inferior to screen printed matter in terms of high film thickness, high durability, high weather resistance, high chemical resistance, strong adhesion onto a variety of objects to be printed and high functionality, as well as suitability for shape working, and so they are unsuitable for creation of printed matter with curves, folds and shape working, for which greater durability and functionality are desired for designs on vehicle interior device control panels, household electrical appliance display panels, tablet terminal frames and packages, and black stripes or black matrices for light modulation in electrical and electronic parts.

Prior Patent Document 1 (Japanese Unexamined Patent Application Publication No. 2010-047716) and Prior Patent Document 2 (Japanese Unexamined Patent Application Publication No. 2010-047649) each disclose a conductive ink composition and conductive coating film for screen printing that can form high-definition patterns, but techniques relating to the flow property of ink for printing with both fine patterns and solid patterns have not been pursued, and so while fine patterns can be obtained with satisfactory printing precision, in the case of solid patterns, the leveling property is poor and printing abnormalities are generated. Furthermore, the technical scope of Prior Patent Document 1 is restricted to printing of fine patterns with the conductive ink composition, and it does not disclose technology relating to an ink composition for screen printing that is suitable for shape working and is printed with high precision onto thermoplastic resin substrates.

In addition, in Prior Patent Document 3 (Japanese Unexamined Patent Application Publication No. 2003-238876) and Prior Patent Document 4 (Japanese Unexamined Patent Application Publication No. 2003-294930), ink compositions for screen printing allowing formation of high-definition patterns are disclosed, and similar to Prior Patent Document 1, technology for highly precise printing of fine patterns is disclosed, but following technologies are not disclosed:
technology relating to ink compositions for simultaneous printing of fine patterns and solid patterns in a single step, and technology relating to an ink composition for screen printing that is suitable for shape working and is printed with high precision onto thermoplastic resin substrates.

CITATION LIST

Patent Document

[Prior Patent Document 1] Japanese Unexamined Patent Application Publication No. 2010-047716
[Prior Patent Document 2] Japanese Unexamined Patent Application Publication No. 2010-047649
[Prior Patent Document 3] Japanese Unexamined Patent Application Publication No. 2003-238876
[Prior Patent Document 4] Japanese Unexamined Patent Application Publication No. 2003-294930

SUMMARY OF THE INVENTION

Problems to be Solved by the Invention

The present invention has been accomplished in light of the problems described above, and it relates to an ink composition for high-quality/high-definition screen printing that has both durability and flexibility which allows printing of both fine patterns such as fine dot patterns or fine line patterns, and wide-area solid patterns, simultaneously in a single step by screen printing, which has been considered impossible to achieve by conventional screen printing, and also that makes it possible to obtain printed matter that is suitable for shape working, as well as to printed matter produced by the screen printing ink composition and to a method for producing the printed matter, and especially to printing onto thermoplastic resin substrates.

Means for Solving the Problems

The invention relates to an ink composition for screen printing to be used onto a thermoplastic resin substrate that can produce printed matter comprising both a solid image pattern and a fine image pattern with the spreading width of no more than 10 μm from the image design dimensions of the printing plate at the edges or outlines of any section in the printed image, when producing printed matter by screen printing onto a thermoplastic resin substrate using a 360-mesh screen printing plate formed by a high-strength, non-deforming stainless steel mesh with a filament diameter of 25 μm,
wherein the measured flow radius value of the ink composition is 13.0 to 24.0 mm after 1 minute from the start of measurement by a flow property measuring method using a spread meter at 25° C. according to JIS K5701-1:2000,
the inequality "F60"–"F45"≤1.0 mm is satisfied, wherein "F60" is defined as the measured flow radius value after 1 minute and "F45" is defined as the measured flow radius value after 45 seconds from the start of measurement by the flow property measuring method using the spread meter,
the viscosity is 5 to 180 Pa·s as measured with a BH-type rotating viscosimeter at 25° C.,
the thixotropic index (TI value) is 2.0 to 8.0,
the composition contains a solvent with a boiling point of not less than 170° C. at not less than 70 mass % of the total solvent and
a thermoplastic polymer with a weight-average molecular weight of not less than 4000 and with a Tg (softening point) of 20 to 95° C. at not less than 10 mass % with respect to the total ink composition, and that can produce printed matter,
wherein the printed image coating film has an elongation percentage of not less than 250% under vacuum forming or pressure forming.

Effect of the Invention

According to the ink composition for screen printing grounding on to the invention, it has become possible to form printed matter comprising combinations of fine patterns and large-area solid patterns with high quality and high definition by screen printing with a single screen printing step, forming printed coating films having sufficient adhesion, durability, flexibility and shape working suitability on thermoplastic resin substrates.

BEST MODE FOR CARRYING OUT THE INVENTION

As is mentioned above, the invention relates to an ink composition for screen printing to be used onto a thermoplastic resin substrate that can produce printed matter comprising both a solid image pattern and a fine image pattern with the spreading width of no more than 10 μm from the image design dimensions of the printing plate at the edges or outlines of any section in the printed image, when producing printed matter by screen printing onto a thermoplastic resin substrate using a 360-mesh screen printing plate formed by a high-strength, non-deforming stainless steel mesh with a filament diameter of 25 μm,
wherein the measured flow radius value of the ink composition is 13.0 to 24.0 mm after 1 minute from the start of measurement by a flow property measuring method using a spread meter at 25° C. according to JIS K5701-1:2000,
the inequality "F60"–"F45"≤1.0 mm is satisfied, wherein "F60" is defined as the measured flow radius value after 1 minute and "F45" is defined as the measured flow radius value after 45 seconds from the start of measurement by the flow property measuring method using the spread meter,
the viscosity is 5 to 180 Pa·s as measured with a BH-type rotating viscosimeter at 25° C.,
the thixotropic index (TI value) is 2.0 to 8.0,
the composition contains a solvent with a boiling point of not less than 170° C. at not less than 70 mass % of the total solvent and a thermoplastic polymer with a weight-average molecular weight of not less than 4000 and with a Tg of 20 to 95° C. at not less than 10 mass % with respect to the total ink composition, and that can produce printed matter, wherein the printed image coating film has an elongation percentage of not less than 250% under vacuum forming or pressure forming.

As compatible state of solid image patterns and fine image patterns according to the invention, it may be exampled for printed images that are dot patterns of about 50 to 100 μm, fine line patterns of about 50 to 100 μm, any of various solid patterns with an area of about not less than 25 cm², and combinations of these that are adjacent across spacings of about 30 to 150 μm.

The invention is also an ink composition for screen printing wherein the solvent with a boiling point of not less than 170° C. includes isophorone and/or a dialkyl adipate ester.

The invention is still further an ink composition for screen printing wherein the weight-averaged Tg is 45 to 90° C., when the Tg of a single or of multiple thermoplastic polymers present in the ink composition for screen printing is weight-averaged.

The invention is also an ink composition for screen printing, wherein the thermoplastic polymer is a polyester resin.

The invention still further relates to an ink composition for screen printing, wherein the ink composition contains at least one coloring material, extender pigment and filler, either of one type or multiple types or a combination thereof, and the coloring material, extender pigment and filler are dispersed in the ink composition with a mean particle size of no less than 35 μm.

The invention still further relates to an ink composition for screen printing that is an ink composition for graphic decorative screen printing.

The invention still further relates to an ink composition for screen printing that is an ink composition for screen printing to be used for black matrix, black stripe, resist pattern, spacer or light guiding panel dot formation.

The invention still further relates to printed matter formed by screen printing onto a thermoplastic resin substrate, using the screen printing ink composition.

The invention still further relates to a method for producing printed matter, wherein printed matter is produced by the screen printing ink composition for screen printing onto a thermoplastic resin substrate.

The ink composition for screen printing of the invention contains a solvent with a boiling point of not less than 170° C., at not less than 70 mass % of the total solvent. If the solvent with a boiling point of not less than 170° C. is not present in an amount of at least 70 mass % of the total solvent, rapid ink drying on the screen printing plate will cause clogging due to an ink-dried coating on the screen printing plate, and defects will be produced in the fine pattern or at the solid image edge sections, making it impossible to obtain a high-definition printed matter with high quality.

There are no particular restrictions on solvents other than the solvent with a boiling point of not less than 170° C. to be present in the ink composition for screen printing of the invention, but in order to attenuate the evaporation rate of the solvent with a boiling point of not less than 170° C., by azeotropic evaporation, and obtain more satisfactory stability of the screen printing ink composition on the screen plate, it is preferred to use solvents whose boiling points are not below 100° C.

The solvent with a boiling point of not less than 170° C. according to the invention may be list up a mixed solvent of butylcellosolve acetate and dialkyl adipate ester, an organic solvent such as isophorone, 3-methoxy-3-methylbutanol, 3-methoxy-3-methylbutyl acetate, coal tar naphtha with a boiling point of not less than 170° C., diethyleneglycol monoethyl ether (acetate), diethyleneglycol monobutyl ether (acetate) or triethyleneglycol monobutyl ether (acetate), and/or a (meth)acrylate monomer, vinyl ether monomer or amide monomer that hardens under activating energy rays.

Particularly preferred among these is a solvent of isophorone and dialkyl adipate ester from the viewpoint of satisfactory solubility of resins in the ink composition and satisfactory wettability of the thermoplastic resin substrate on the surface, which makes it easier to obtain more excellent adhesion. A solvent including a dialkyl adipate ester is commercially available under the trade name Flexisolv DBE, by Invista.

Preferred examples of solvents whose boiling point is not below 100° C., according to the invention, include xylene, cyclohexanone, coal tar naphtha with a boiling point of 160 to 170° C., mineral spirits with a boiling point of 150 to 170° C., 1-methoxy-2-propanol, 1-methoxypropyl-2-acetate and diacetone alcohol.

The solvent of the invention needs only contain not less than 70 mass % of a solvent with a boiling point of not less than 170° C. among the total solvent, but in order to further stabilize the screen printing properties for fine patterns, the boiling point of the solvent is preferably not less than 190° C.

However, since using mineral oil or vegetable oil with a boiling point exceeding 250° C. as the solvent results in a poor drying property of the printed coating film, when a solvent having a boiling point of not less than 250° C. is used, it is preferably used at not more than 25 mass % of the total solvent amount.

In addition, the ink composition for screen printing of the invention contains at least a thermoplastic polymer with a weight-average molecular weight of not less than 4,000 and a Tg of 20 to 95° C., as a binder resin, at not less than 10 mass % with respect to the total ink composition.

If the weight-average molecular weight of the thermoplastic polymer is less than 4,000, disadvantages may result, including weakening of the adhesion and durability of the printed coating film on thermoplastic resin substrates, and melting of a portion of the printed coating film by heat during shape working. On the other hand, if the weight-average molecular weight is greater than 200,000, disadvantages may result including poor solubility in the solvent and a large amount of time and effort being necessary for production of the ink composition, as well as the need for shape working at high temperature in order to ensure sufficient elongation during shape working. Therefore, a more preferred weight-average molecular weight range is about 4,000 to 100,000, and an even more preferred range is about 5,000 to 50,000.

One or more thermoplastic polymers may be used, and the Tg of the thermoplastic polymer(s) is 20 to 95° C.

If the Tg is lower than 20° C., the ink printed coating film will have reduced cohesion, resulting in inconveniences such as fusion in portions of the ink printed coating film by the heat of shape working and the like, while if the Tg is higher than 95° C., the softening property by heating of the ink coating film will be poor and it is impossible to obtain sufficiently the necessary elongation properties during shape working.

The preferred range for the Tg properties of the thermoplastic polymer is a weight-averaged Tg of 40 to 90° C., when the Tg for one or multiple thermoplastic polymers present in the ink composition for screen printing has been weight-averaged.

The weight-averaged Tg herein referred is, for example, when thermoplastic polymer A and thermoplastic polymer B are present in the ink composition, the Tg calculated as follows: Weight-averaged Tg=[(Tg of thermoplastic polymer A×mass % of thermoplastic polymer A in the ink for screen printing)+(Tg of thermoplastic polymer B×mass % of thermoplastic polymer B in the ink for screen printing)]/[mass % of thermoplastic polymer A in the ink for screen printing+mass % of thermoplastic polymer B in the ink for screen printing].

If this weight-averaged Tg is 40 to 90° C., it is easy to obtain a printed coating film having no defects and having sufficient elongation properties, by vacuum forming or pressure forming in which a three-dimensional shape is formed while applying heat of about 150 to 190° C.

On the other hands, it was found that a Tg range of 40 to 90° C. is more preferred for the thermoplastic polymer in the printing ink, when multiple thermoplastic polymers are present, it was found that similarly favorable results can be obtained if the weight-averaged Tg is 40 to 90° C. even if each Tg is not in the range of 40 to 90° C.

The reason for this is not entirely clear, but the present inventors presume that possibly the low-Tg thermoplastic polymer (which must of course have a Tg of not less than 20° C.) and the high-Tg thermoplastic polymer (which must of course have a Tg of no higher than 95° C.) behave as if they were one type of integrally fused resin in the printing ink, the low-Tg thermoplastic polymer portion contributing to ensure the thermosoftening property and elongation property and the high-Tg thermoplastic polymer portion contributing to ensure the heat fusion resistance.

Furthermore, in the case that the content of the thermoplastic polymer with a weight-average molecular weight of not less than 4,000 and a Tg of 20 to 95° C. is less than 10 mass % of the total ink composition, this may lead to reduced adhesion and durability of the printed coating film onto the thermoplastic resin substrate, and undesirable results such as leveling defects or pinhole generation in the printed coating film due to poor dispersion of the coloring agent, and the amount of polymer as ink binder will be insufficient for shape working, making it impossible to obtain adequate elongation properties. On the other hand, in the case that the content exceeds 70 mass %, the viscosity may become too high making it difficult to accomplish uniform screen printing, or the mixing ratio of the solvent with a boiling point of not less than 170° C. will be lower, tending to result in easier drying of the ink on the screen printing plate and tending to result in clogging of fine patterns. Therefore, a more preferred thermoplastic polymer content is about 11 to 70 mass % with respect to the total amount of ink composition, a more preferred range is 12 to 65 mass % and a most preferred range is 13 to 60 mass %.

The thermoplastic polymer of the invention has a weight-average molecular weight of not less than 4000 and a Tg of 20 to 95° C., and there are no particular restrictions on the type or mixing ratio as long as the content is not less than 10 mass % with respect to the total amount of the ink composition and no greater than 70 mass % which allows dissolution in the solvent in the ink composition, although it is desirable to avoid highly hazardous harmful substances, such as substances that are strongly toxic for humans or organisms or substances that create a high environmental load.

Examples for the thermoplastic polymer include polyester resins, various types of modified polyester resins such as urethane-modified polyester resins, epoxy-modified polyester resins and acryl-modified polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins such as ethyl cellulose resin, nitrocellulose resins, cellulose acetate butyrate (CAB) and cellulose acetate propionate (CAP), rosin resins, maleic acid resins, natural resins and alkyd resins, any of which may be used alone or in combination.

Among these thermoplastic polymers, polyester resins, urethane resins, acrylic resins, vinyl chloride-vinyl acetate copolymer resins and epoxy resins are preferred from the viewpoint of excellent adhesion and durability for thermoplastic resin substrates, polyester resins are particularly preferred since they easily impart flexibility and elongation properties for molding workability.

According to the invention, the elongation percentage of the printed coating film is not less than 250%, with the printing ink composition comprising a solvent with a boiling point of not less than 170° C. at not less than 70 mass % of the total solvent, and a thermoplastic polymer with a weight-average molecular weight of not less than 4,000 and a Tg of 20 to 95° C. at not less than 10 mass % of the total ink composition.

The elongation percentage is based on elongation of not less than 250% without damage after a printed image having a given length before shape working has been subjected to shape working by vacuum forming or approximately vacuum forming in which a three-dimensional shape is formed while heating at about 150 to 190° C., and for example, when the elongation percentage is 250%, it indicates elongation of 2.5 cm, corresponding to 2.5 times after shaping of a printed image with a length of 1 cm before shaping, for a final length of 3.5 cm.

If the elongation percentage of the printed coating film is less than 250%, the degree of flexibility lacks of three-dimensional shape moldability necessary for practical use. For ordinary applicability to recent multicolor three-dimensional shape designs, an elongation percentage of 250% is necessary at least, and an elongation percentage of 300% is more preferred, and an elongation percentage of about not less than 400% is more preferred in order to widen to a width corresponding to deep drawing three-dimensional shape working.

The printing ink composition having such an elongation percentage can be obtained by a composition that comprises a solvent with a boiling point of not less than 170° C. at not less than 70 mass % of the total solvent, and that comprises a thermoplastic polymer with a weight-average molecular weight of not less than 4000 and a Tg of 20 to 95° C. at not less than 10 mass % of the total ink composition.

While an elongation percentage of up to about 900% can be achieved for the printed coating film with the composition specified above, preferably the elongation percentage is no greater than about 600%. Because, an increasing elongation percentage tends to result in more damage to the printed coating film and greater surface tack, tending to produce damage when the printed matter is carried, and tending to result in sticking when the printed matter is stacked (i.e. "blocking").

The invention is an ink composition for screen printing that can produce printed matter with a spreading width of no greater than 10 μm with respect to the image design dimensions of a printing plate at the edges or outlines of any section in the printed image comprising both a solid image pattern and a fine image pattern, and that has properties allowing both high quality and high definition printing to be achieved.

Therefore, a viscosity of the ink composition for screen printing of the invention is of 5 to 180 Pa·s, preferably 50 to 120 Pa·s and more preferably 60 to 100 Pa·s, as measured by a BH-type rotating viscosimeter.

If the viscosity is lower than 5 Pa·s, bleeding and spreading may occur in the fine patterns and solid image edge sections making it impossible to obtain a high-quality/high-definition printed image, on the other hands, if the viscosity is higher than 180 Pa·s, the ink may not be uniform on the screen printing plate, or parting of the ink from the screen printing plate may be poor, producing abnormalities in solid images or creating defects in fine patterns or image edge sections.

The viscosity value measured by a BH-type rotating viscosimeter according to the invention is the measured value at 1 minute after the start of measurement at a rotor rotational speed of 20 rpm, with a No. 5 or No. 6 rotor for a viscosity range of 5 to 10 Pa·s, with a No. 6 or No. 7 rotor for a viscosity range of 10 to 50 Pa·s and with a No. 7 rotor for a viscosity range of not less than 50 Pa·s.

Also, a thixotropic index (TI value) of the ink composition for screen printing of the invention is 2.0 to 8.0, and preferably 4.0 to 7.0. If the TI value is less than 2.0, the ink flow property will increase, resulting in spreading in printed images with the passage of time after printing even if the viscosity is 180 Pa·s, such that fine patterns or image edge sections may become enlarged. If the TI value exceeds 8.0, the degree of protrusion of the ink from the screen printing plate will be excessive even if the viscosity is 5 Pa·s, such that bleeding may occur in fine patterns and at image edge sections making it impossible to obtain sharp printed images, or the flow property with time may be impaired, resulting in poor leveling especially on solid images.

The "TI value," for the purpose of the invention, is the ratio of the viscosity value with 2 rotations and the viscosity value with 20 rotations of the BH-type rotating viscosimeter at 25° C., or in other words the value: [viscosity with 2 rotations of BH-type rotating viscosimeter/viscosity with 20 rotations of BH-type rotating viscosimeter]. The rotor used is a No. 5 to No. 7 rotor depending on the viscosity, according to the common method.

Furthermore, according to the invention, a measured flow radius value (hereinafter referred to as "flow value") of the ink composition is 13.0 to 24.0 mm after 1 minute from the start of measurement by a flow property measuring method using a spread meter at 25° C. according to JIS K5701-1: 2000, and is preferably 15.0 to 18.0 mm.

If the flow value is less than 13.0 mm, it is difficult that the ink protrude from the screen printing plate, so it is required to increase printing pressure of the squeegee during screen printing. And it is unavoidable that the holes of the mesh of the screen printing plate will become clearly visible at the image edge sections and raggedness or loss of linearity will occur at the image edge sections, because the flow property of the ink with time lapsing changes to be too poor.

On the other hands, if the flow value is greater than 24.0 mm, it is required to make lower the printing pressure of the squeegee during screen printing, because, the degree of ink protrusion from the screen printing plate tends to increase and the flow of ink tends to spread.

Moreover, the flow value represents the radius value of ink that has flowed after 1 minute from the start of measurement with a spread meter as is mentioned above (hereinafter defined as "F60"), and in the case that the radius value after 45 seconds from the start of measurement with a spread meter is defined as "F45," then the ink composition must be within the above-mentioned flow value range and the range of "F60"−"F45"≤1.0 mm must be satisfied, in order to obtain stable high quality and high definition printed images. Because the ink must have a suitable flow property during printing, and the flow property must be such as to minimize large range of spreading with the passage of time after printing.

Explaining more detailedly, the present inventors found that the condition "F60"−"F45"≤1.0 mm, with the conditions for the flow value described in paragraph [0036], must be satisfied to obtain satisfactorily stable high-quality and high-definition printed images.

In already-mentioned Prior Patent Document 2 (Japanese Unexamined Patent Application Publication No. 2010-047649), only the difference in flow value at 10 seconds and 90 seconds with a spread meter as the slope value is disclosed, but the appropriate range for the flow value is not disclosed.

Also, the standard for judging printing suitability in Prior Patent Document 2 regulates merely image printing precision of ±5%, and it does not disclose the viewpoint of a microlevel judgment standard, which is adopted for high quality and high definition according to the invention, i.e. an edge spreading width of not more than 10 μm even at the edge sections of an image, when a printed image comprising a combination of a fine pattern image and a solid pattern image is printed by a single screen printing.

In the invention, the present inventors confirmed that when the flow value is less than the lower limit of 13.0 mm as specified by the invention, even if "F60"−"F45"≤1.0 mm is satisfied, the flow property of the ink composition is insufficient tending to result in visible jaggedness at the printed image edge sections, and when the flow value is not less than the upper limit of 24.0 mm as specified by the invention, even if "F60"−"F45"≤1.0 mm is satisfied, the flow property of the ink composition increases excessively, resulting in a greater spreading width of the printed image edge sections, and the present invention has thereupon been completed.

In other words, the present inventors confirmed that, for creation of printed matter comprising a combination of solid patterns and fine patterns, it is possible to obtain a high degree of high-quality and high-definition printed image quality by screen printing in a single step by combining a regulation of a suitable value of 13.0 to 24.0 mm and a regulation of "F60"−"F45"≤1.0 mm.

Of course, the viscosity and the TI value must also both be in the ranges specified above.

The ink composition of the invention is an ink composition for high-quality/high-definition screen printing that at least, when printed matter is created by screen printing onto a thermoplastic resin substrate using a 360-mesh screen printing plate formed by a high-strength, non-deforming stainless steel mesh with a filament diameter of 25 μm, can produce printed matter comprising both a solid image pattern and a fine image pattern, wherein the spreading width at the edges or outlines of any section in a printed image is no more than 10 μm from the image design dimensions of a printing plate. If the printed image edge spreading width exceeds 10 μm, enlarged sections of the printed image with respect to the printing plate image design will be visibly apparent and the printed image will become visibly palated, so that it may no longer be considered high-quality/high-definition decorative printing.

As mentioned above, an ink composition for high-quality and high-definition screen printing to be used on a thermoplastic resin substrate having such durability and flexibility as well as suitability for shape working, contains at least a solvent with a boiling point of not less than 170° C. at not less than 70 mass % of the total solvent, contains at least a thermoplastic polymer with a weight-average molecular weight of not less than 4,000 and a Tg of 20 to 95° C. at not less than 10 mass % with respect to the total ink composition, has at least a viscosity of 5 to 180 Pa·s as measured with a BH-type rotating viscosimeter at 25° C., has at least a thixotropic index of 2.0 to 8.0, has the measured flow radius value of the ink composition being 13.0 to 24.0 mm after 1 minute from the start of measurement by a flow property measuring method using a spread meter at 25° C. according to JIS K5701-1:2000, satisfies the inequality "F60"–"F45"≤1.0 mm, wherein "F60" is defined as the measured flow radius value after 1 minute and "F45" is defined as the measured flow radius value after 45 seconds from the start of measurement by the flow property measuring method using the spread meter, and the ink composition for screen printing is used onto a thermoplastic resin substrate and can produce printed matter wherein the printed image coating film which may form an elongation percentage of not less than 250% by vacuum forming or pressure forming.

Additionally, in the case that the ink composition for high-quality/high-definition screen printing with suitability for shaping, satisfies the "preferred conditions and/or desirable conditions" mentioned below, its production will be further facilitated and the high-quality and high-definition quality as printed matter may be improved.

Here, when the term "zero" μm is used for the printed image edge spreading width, it means complete absence of spreading of the printed ink and printing as prescribed by the image design on the printing plate, but since the printing plate exists in a state with a knitted screen mesh, even in cases where no spreading of the ink is present after printing there can be an effect of the presence of the screen mesh, tending to create minute chipping or jaggedness at the printed image edge sections. Therefore, the spreading width for decorative printing images is preferably 2 to 10 μm and more preferably 3 to 8 μm.

Preferred examples for the screen mesh, screen printing plate and screen printing conditions will now be described.

The 360 mesh screen mesh made of a high-strength, non-deforming stainless steel mesh may be exampled by HS-D360 by Asada Mesh Co., Ltd. (mesh filament diameter: 25 μmφ, calendered mesh thickness: 29 μm, open area ratio: 42%, strength index: 2.56 as indicated by Asada Mesh Co., Ltd.)

The printing plate is preferably a stainless steel/stainless steel combination plate, with an emulsion thickness of 7 to 20 μm using an appropriate commercially available photosensitive emulsion, and further flat-processed on the emulsion surface.

The screen printing conditions may be, as a preferred example, a squeegee with a 60 to 90 degree hardness, a clearance of 3 to 7 mm, pressing with a squeegee printing pressure of 1.5 to 2.0 mm, a squeegee angle of 50 to 80 degrees, a squeegee speed of 80 to 400 mm/sec and pressing with a scraper pressure of 1.0 to 2.0 mm.

Here, it is an essential condition in the ink composition for screen printing of the invention that, at least for printed matter screen printed using a 360-mesh screen printing plate made of a high-strength, non-deforming stainless steel mesh with a filament diameter of 25 μm, it can produce printed matter with a spreading width of no more than 10 μm at any edge or outline section of a printed image with respect to the image design dimensions of a printing plate comprising both a solid image pattern and a fine image pattern, and therefore even when printed using a screen printing plate made of another type of screen mesh, the ink composition for screen printing belongs to the technical scope of the invention in the case of the ink composition for screen printing conforming to the necessary conditions of the invention.

Needless to say, when using a screen printing plate made of a high-strength, non-deforming stainless steel mesh that exceeds 360 mesh (for example, 500 mesh, 640 mesh or 840 mesh), spreading of the printed image edges will be even further reduced and the printed image edge sections will be sharper.

Furthermore, when the ink composition for screen printing of the invention contains at least one coloring material, extender pigment or filler, either of one type or multiple types, or a combination thereof, the coloring material, extender pigment and filler is preferably dispersed in the ink composition with a mean particle size of no greater than 35 μm. When a coloring material, extender pigment or filler with a mean particle size exceeding 35 μm after dispersion is present, clogging of the mesh spacings of the 360 mesh screen printing plate may occur, potentially creating chipping and pinholes in the printed image.

The method for dispersing the coloring material, extender pigment and filler in the ink composition for screen printing of the invention is not restricted, and examples include dispersion using a blade-stirred disperser, bead disperser or triple roll disperser.

The coloring agent, extender pigment and filler are not particularly restricted, and examples of coloring agents include azo pigments, disazo pigments, bisazo pigments, phthalocyanine pigments, anthraquinone-based pigments, isoindoline pigments, dioxazine pigments, quinacridone pigments, perylene-based pigments, carbon black pigments, lake black pigments, perylene black pigments, aniline black pigments, iron oxide pigments, titanium pigments, zinc sulfide pigments and various chromatic color dyes, any one of which or two or more in combination may be used, such coloring materials being preferably used in a mixing ratio of no greater than 95 mass % with respect to the ink composition. The amount is preferably no greater than 50 mass %.

Examples of extender pigments include (fine particulate) silica, talc, calcium carbonate, magnesium carbonate, bentonite, sedimentary barium sulfate, zinc oxide and alumina, any one of which or two or more in combination may be used, such extender pigments being preferably used in a mixing ratio of no greater than 30 mass % with respect to the ink composition.

Examples of fillers include resin beads, metallic particles, metal powder, metal oxide powder, graphite, pearl pigment, fluorescent pigments, wax particles and protein powder. Also following functional materials may be included, such as ultraviolet absorbing materials, antimicrobial materials, heat absorbing materials, refractive index-modifying materials, slidability-imparting materials, slidability-preventing materials, phosphorescent materials, polarizing materials, anti-reflection materials and diffusible materials. These may be used alone or in combinations of multiple types, and such fillers are preferably used in a mixing ratio of no greater than 95 mass %, more preferably no greater than 50 mass % and even more preferably no greater than 30 mass %, with respect to the ink composition.

When the ink composition is used as an ink for graphic decorative screen printing, it is possible to produce high-definition graphic decorative screen printed matter of high quality, that has not been achievable with conventional screen printing, namely having excellent precision with excellent linearity of image edge sections and free of chipping or spreading in fine dots, and simultaneously exhibiting rich color shade expression and different types of functionality.

Furthermore, an ink composition for screen printing of the invention containing the above-mentioned coloring agents, extender pigments and fillers is not limited to such graphic decorative screen printed matter, and can be used to produce high-definition screen printed matter even when used for printing onto electric and electronic parts, such as black matrix or stripe printing for increasing display visibility, pattern printing for function as a resist, spacer printing to avoid contact between members, or dot printing designed for specific area sizes, to ensure uniformity of luminance in light guiding panels.

Generally speaking, black inks with a high masking property are usually used for black matrix or stripe printing, white inks, black inks, chromatic color inks, transparent inks, dispersive inks and/or the mixed inks are usually used for resist printing or spacer printing, and inks containing fillers with light diffusing functions such as silica or various types of beads, are usually used for light guiding panel dot printing.

The invention also provides printed matter produced by the screen printing ink composition for screen printing onto a thermoplastic resin substrate.

The invention still further provides a method for producing printed matter, wherein printed matter is produced by the screen printing ink composition for screen printing onto a thermoplastic resin substrate.

In the printed matter and the method for producing printed matter provided by the invention, the thermoplastic resin substrate to be used may be a substrate that is a sheet or film of a polycarbonate resin, treated (or untreated) polyester resin, acrylic resin, vinyl chloride resin, polypropylene resin or polyethylene resin, or any mixture of such resins.

EXAMPLES

Examples and Comparative Examples of the invention are shown in [Table 1] below. However, the invention is not limited to these examples.

TABLE 1

| | Example 1 | Example 2 | Example 3 | Example 4 | Example 5 | Example 6 | Example 7 | Example 8 |
|---|---|---|---|---|---|---|---|---|
| <Ink composition components> | | | | | | | | |
| Polyester resin A (molecular weight: 3500, Tg 50° C.) | | | | 10.0 | | | | |
| Polyester resin A (molecular weight: 4000, Tg 35° C.) | | | 10.0 | 25.0 | | | 70.0 | |
| Polyester resin B (molecular weight: 6000, Tg 45° C.) | | | 10.0 | 25.0 | | | | 40.0 |
| Polyester resin C (molecular weight: 16000, Tg 20° C.) | 15.0 | 10.0 | | | | | | 5.0 |
| Polyester resin D (molecular weight: 25000, Tg 70° C.) | 15.0 | | 10.0 | | | | | |
| Acrylic resin (molecular weight: 100000, Tg 95° C.) | | | | | 10.0 | 30.0 | | |
| Vinyl chloride-vinyl acetate copolymer resin (molecular weight: 40000, Tg 75° C.) | | | | | 20.0 | | | |
| Isophorone (boiling point: 216° C.) | 20.0 | 10.0 | 5.0 | 35.0 | 40.0 | 7.0 | 7.0 | |
| Flexisolv DBE (boiling point: 203-245° C.) | 20.0 | 10.0 | 5.0 | | | 20.0 | 7.0 | 25.0 |
| Butylcellosolve acetate (boiling point: 192° C.) | | 4.0 | | 10.0 | | | | |
| Coal tar naphtha (boiling point: 180-200° C.) | 5.0 | | 5.0 | | | 10.0 | | 3.0 |
| 3-Methoxy-3-methyl butanol (boiling point: 174° C.) | | | | | | 5.0 | 5.0 | |
| 1-Methoxypropyl-2-acetate (boiling point: 146° C.) | | | 10.0 | | | | | |

TABLE 1-continued

|  |  |  |  |  |  |  |  |  |
|---|---|---|---|---|---|---|---|---|
| 1-Methoxy-2-propanol (boiling point: 120° C.) |  |  | 7.0 |  |  |  |  |  |
| Cyclohexanone (boiling point: 156° C.) |  |  |  | 7.0 |  |  |  |  |
| Diacetone alcohol (boiling point: 168° C.) |  |  |  |  | 7.0 |  |  |  |
| Type of coloring agent, etc. | Carbon black | Titanium oxide |  | Phthalo-cyanine blue | Disazo yellow | Pearl powder | Quinacri-done pink | Aluminum powder |
| Composition of coloring agent | 15.0 | 45.0 |  | 5.0 | 10.0 | 15.0 | 5.0 | 22.0 |
| Additives (antifoaming agent, leveling agent, etc.) | 3.0 | 3.0 | 3.0 | 3.0 | 3.0 | 3.0 | 3.0 | 3.0 |
| Silica | 5.0 | 3.0 | 10.0 |  | 3.0 | 5.0 | 3.0 | 2.0 |
| Talc | 2.0 | 5.0 | 15.0 |  | 2.0 | 10.0 |  |  |
| <Total component weight ratio> | 100.0 | 100.0 | 100.0 | 100.0 | 100.0 | 100.0 | 100.0 | 100.0 |
| Weight-averaged Tg [° C.] of thermoplastic polymer | 45.0 | 20.0 | 50.0 | 40.0 | 81.7 | 95.0 | 35.0 | 42.2 |
| Substrate to be printed (sheet-like substrate) | Poly-carbonate | Treated polyester | Poly-carbonate | Treated polyester | Poly-carbonate | Treated polyester | Poly-carbonate | Poly-carbonate |
| <Physical property values> |  |  |  |  |  |  |  |  |
| Viscosity [Pa · s] | 45.0 | 5.0 | 180.0 | 50.0 | 30.0 | 100.0 | 60.0 | 40.0 |
| TI value [−] | 6.0 | 3.5 | 8.0 | 2.0 | 6.0 | 3.0 | 5.0 | 7.0 |
| Flow value [mm] | 17.0 | 24.0 | 13.0 | 16.0 | 19.0 | 16.0 | 17.0 | 16.0 |
| F60-F45 [mm] | 0.6 | 0.3 | 0.1 | 0.7 | 0.2 | 0.8 | 1.0 | 0.4 |
| Mean particle size of particles in ink [μm] | 20.0 | 15.0 | 10.0 | 35.0 | 20.0 | 10.0 | 1.0 | 20.0 |
| Image edge spreading width of 100 μm lateral fine line [μm] | 5.0 | 9.5 | 1.0 | 6.0 | 5.0 | 9.0 | 7.5 | 6.5 |
| Image edge spreading width of 100 mm square [μm] | 5.2 | 10.0 | 1.1 | 6.6 | 5.4 | 9.5 | 8.0 | 6.9 |
| <Printed image evaluation> |  |  |  |  |  |  |  |  |
| Evaluation of high-quality/high-definition property of 100 μmϕ dot-printed image | VG | G | VG | G | VG | G | VG | G |
| Evaluation of high-quality/high-definition property of 100 μm lateral fine line-printed image | VG | G | G | G | VG | G | G | VG |
| Evaluation of high-quality/high-definition property of 100 mm side-square solid image | VG | G | G | VG | VG | G | G | VG |
| Evaluation of 250% elongation section in vacuum forming (Image coating elongation [%]) | VG (≥400) | G (≥250) | VG (≥350) | G (≥300) | VG (≥400) | G (≥250) | G (≥250) | VG (≥350) |

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| <Ink composition components> |  |  |  |  |  |  |  |
| Polyester resin A (molecular weight: 3500, Tg 50° C.) | 25.0 |  |  |  |  |  |  |
| Polyester resin A (molecular weight: 4000, Tg 35° C.) |  |  |  |  |  |  | 20.0 |
| Polyester resin B (molecular weight: 6000, Tg 45° C.) |  |  |  |  |  |  | 20.0 |

TABLE 1-continued

| | | | | | | | |
|---|---|---|---|---|---|---|---|
| Polyester resin C (molecular weight: 16000, Tg 20° C.) | | | 4.0 | | | 10.0 | |
| Polyester resin D (molecular weight: 25000, Tg 70° C.) | 5.0 | 10.0 | 4.0 | | | 10.0 | |
| Acrylic resin (molecular weight: 100000, Tg 95° C.) | | | | 60.0 | 5.0 | | |
| Vinyl chloride-vinyl acetate copolymer resin (molecular weight: 40000, Tg 75° C.) | | | | | 10.0 | | |
| Isophorone (boiling point: 216° C.) | 20.0 | | 25.0 | 30.0 | 40.0 | 42.0 | |
| Flexisolv DBE (boiling point: 203-245° C.) | 10.0 | 26.0 | | | | 10.0 | 5.0 |
| Butylcellosolve acetate (boiling point: 192° C.) | | 10.0 | | | | 10.0 | 10.0 |
| Coal tar naphtha (boiling point: 180-200° C.) | 10.0 | | 24.0 | | | | 10.0 |
| 3-Methoxy-3-methyl butanol (boiling point: 174° C.) | | | | | | | |
| 1-Methoxypropyl-2-acetate (boiling point: 146° C.) | 2.0 | | 5.0 | | | | 7.0 |
| 1-Methoxy-2-propanol (boiling point: 120° C.) | | 3.0 | | | | | |
| Cyclohexanone (boiling point: 156° C.) | | | 5.0 | 5.0 | | 5.0 | |
| Diacetone alcohol (boiling point: 168° C.) | | | | | | 5.0 | |
| Type of coloring agent, etc. | Carbon black | Titanium oxide | Phthalocyanine blue | | Carbon black | Quinacridone pink | Carbon black |
| Composition of coloring agent | 15.0 | 45.0 | 15.0 | | 10.0 | 3.0 | 5.0 |
| Additives (antifoaming agent, leveling agent, etc.) | 3.0 | 3.0 | 3.0 | 3.0 | 3.0 | 3.0 | 3.0 |
| Silica | 5.0 | 2.0 | 5.0 | | 20.0 | 2.0 | 10.0 |
| Talc | 5.0 | 1.0 | 10.0 | 2.0 | 12.0 | | 10.0 |
| <Total component weight ratio> | 100.0 | 100.0 | 100.0 | 100.0 | 100.0 | 100.0 | 100.0 |
| Weight-averaged Tg [° C.] of thermoplastic polymer | 53.3 | 70.0 | 45.0 | 95.0 | 81.7 | 45.0 | 40.0 |
| Substrate to be printed (sheet-like substrate) | Polycarbonate | Treated polyester | Polycarbonate | Polycarbonate | Treated polyester | Polycarbonate | Treated polyester |
| <Physical property values> | | | | | | | |
| Viscosity [Pa · s] | 60.0 | 4.0 | 10.0 | 30.0 | 80.0 | 5.0 | 160.0 |
| TI value [−] | 7.0 | 2.0 | 5.0 | 1.5 | 10.0 | 2.0 | 8.0 |
| Flow value [mm] | 16.0 | 24.0 | 18.0 | 23.0 | 13.5 | 25.0 | 12.5 |
| F60-F45 [mm] | 0.5 | 1.0 | 1.0 | 1.2 | 0.1 | 1.6 | 0.1 |
| Mean particle size of particles in ink [μm] | 20.0 | 15.0 | 25.0 | 5.0 | 30.0 | 10.0 | 15.0 |
| Image edge spreading width of 100 μm lateral fine line [μm] | 4.5 | 20.0 | 5.0 | 25.0 | 0.1 | 30.0 | 0.5 |
| Image edge spreading width of 100 mm square [μm] | 4.5 | 30.0 | 5.3 | 40.0 | 0.1 | 50.0 | 0.5 |
| <Printed image evaluation> | | | | | | | |
| Evaluation of high-quality/high-definition property of 100 μmϕ dot-printed image | VG | F | G | P | G | P | VG |

TABLE 1-continued

| | | | | | | | |
|---|---|---|---|---|---|---|---|
| Evaluation of high-quality/high-definition property of 100 μm lateral fine line-printed image | VG | F | G | P | G | P | G |
| Evaluation of high-quality/high-definition property of 100 mm side-square solid image | VG | G | F | F | F | P | F |
| Evaluation of 250% elongation section in vacuum forming (Image coating elongation [%]) | P (150≥) | G (≥250) | P (200≥) | VG (≥300) | G (≥250) | VG (≥400) | G (≥250) |

In table 1, VG, G, F, and P mean following state:
VG: Very Good
G: Good
F: Fair
P: Poor For the ink compositions for screen printing of the examples and comparative examples, the materials listed in Table 1 were uniformly mixed by stirring using a propeller rotating stirrer, in the mixing ratios (mass %) listed in the same table, and then subjected to 2 passes of a triple roll mill disperser, and each produced ink composition was measured for viscosity, TI value, flow value (F60) and F60-F45 value by the methods described above.

Next, the ink compositions for screen printing of the examples and comparative examples were screen printed onto the thermoplastic resin substrates listed in Table 1 with a screen printing plate (emulsion thickness: 15 μm, flat-processed on emulsion surface), produced using an HS-D360 by Asada Mesh Co., Ltd. (mesh filament diameter: 25 μmφ, calendered mesh thickness: 29 μm, open area ratio: 42%, strength index: 2.56 as indicated by Asada Mesh Co., Ltd.). The screen printing conditions were "a squeegee of 80 degrees hardness (urethane material), a clearance of 5 mm, pressing with a squeegee printing pressure of 1.5 mm, a squeegee angle of 75 degrees, a squeegee speed of 400 mm/sec and pressing with a scraper pressure of 1.5 mm."

The screen printing plate was one having a printed image design comprising a 100 μmφ dot pattern, a 100 μm longitudinal fine line pattern parallel or perpendicular to the printing direction, a fine crevice pattern that was parallel or perpendicular to the printing direction and had spacings of 150 μm, and a square solid pattern with 100 mm sides. However, sections of the 100 mm solid pattern were also adjacent across the 150 μm spacings, and the sections with the smallest spacings were 100 μmφ dot pattern design sections aligned across spacings of 30 μm at minimum.

The width of spreading at the image edges after the ink compositions for screen printing of the examples and comparative examples were printed was measured by observing the printed coating film image sections printed with the lateral fine line pattern with a line width of 100 μm which are perpendicular to the printing direction and having 150 μm spacings in the screen printing plate and the 100 mm square solid pattern, using a length meter-mounted digital microscope at 200× magnification, and measuring the spacings between the printed lateral fine lines, and then calculating the difference from the printing plate design value of 150 μm. For example, when the spacings between the printed lateral fine lines were 140 μm, the difference from the printing plate design value of 150 μm was 10 μm, but since the image edges are on both sides of the lateral fine lines, the spreading width at the image edges on one side is 5 μm, and therefore this was recorded as the "spreading width at the image edges."

The measurement results for the spreading width at the 100 μm lateral fine line image edges adjacent across 150 μm spacings and the measurement results for the spreading width at the edges of the 100 mm square images adjacent across 150 μm spacings, printed with printing ink of the invention were almost equivalent results to those of the examples as is described below, and so excellent results are indicated.

Evaluation of the high-quality/high-definition property of the printed images, and the elongation rate at not less than 250% by shape working of the printed images, was made as follows based on direct visual and 200× magnified observation with a digital microscope. The evaluation was conducted for 20th printed object.

Evaluation of [High-Quality/High-Definition Property of 100 μmφ Dot-Printed Image]

VG: Absolutely no defects such as chipping in 100 dot shapes, and no loss of spacings between each of the dots.

G: Fine chipping, bleeding or shape distortion of 1 to 5 dots out of 100, but no loss of spacings between each of the dots, and at a level with no problems for practical use.

F: Chipping, bleeding or shape distortion of 6 to 30 dots out of 100.

P: Abnormalities in 31 or more dots out of 100.

Evaluation of [High-Quality/High-Definition Property of 100 μm Lateral Fine Line-Printed Image]

VG: Enlargement of less than 5 μm, absolutely no defects such as distortion, bleeding or chipping.

G: Approximately 5-10 μm enlargement or thinning, but no loss due to bleeding or chipping.

F: Not less than 11 μm enlargement or thinning.

P: Chipping of fine lines.

Evaluation of [High-Quality/High-Definition Property of 100 mm-Side Square Solid Pattern]

VG: Printed image with satisfactory leveling property and smoothness, and image edge spreading width of not more than 10 μm.

G: Slightly inferior leveling property but within allowable range for practical use, and image edge spreading width of not more than 10 μm.

F: Leveling property within allowable range for practical use, but printing abnormalities occurred, and/or image edge spreading width exceeded 10 μm.

P: Poor leveling property and unsuitable for practical use, with printing abnormalities also present, and/or image edge spreading width exceeding 10 μm.

Evaluation of [Elongation Percentage of not Less than 250% for Printed Images in Shape Working by Vacuum Forming Machine]

VG: A level with absolutely no problems such as transparency or crazing at the shaped sections with elongation percentage of 250%.

G: Transparency at shaped sections with elongation percentage of 250% due to slight fading of color tone, but no abnormalities such as crazing, and non-problematic level for practical use.

F: Transparency or fine crazing at shaped sections with elongation percentage of 250% due to slight fading of color tone, not a level suitable for practical use.

P: Visibly discernible crazing appearing at shaped sections with elongation percentage of 250%, clearly not a level suitable for practical use.

A 200 µm line-width hairline, and a 150 µm line-width stripe grid, a 100 µmφ dot pattern, and, as a test pattern, an image comprising both a 100 mm square solid pattern and 100 µm fine lines were printed by screen printing method using the ink compositions of Examples 1, 3, 5, 7 and 8 and assuming a vehicle meter display panel design, it was possible to obtain high-quality and high-definition screen printed matter with no defects such as bleeding or chipping, and shape worked portions thereof with a vacuum forming machine had absolutely no problems at sections with an elongation percentage of not less than 250%.

Moreover, a 150 µm line-width hairline, and a 150 µm line-width stripe grid, a 100 µmφ dot pattern, and, as a test pattern, an image comprising both a 100 mm square solid pattern and 100 µm fine lines were printed by screen printing method using the ink compositions of Examples 2, 4 and 6 and assuming a household appliance panel and package design, it was possible to obtain high-quality and high-definition screen printed matter with no defects such as bleeding or chipping, and shape worked portions thereof with a vacuum forming machine had absolutely no problems at sections with an elongation percentage of not less than 250%.

The invention claimed is:

1. An ink composition for screen printing to be used on a thermoplastic resin substrate, the ink composition comprising:
   at least one solvent having a boiling point of not less than 170° C. and that is selected from the group consisting of butylcellosolve acetate, dialkyl adipate ester, isophorone, 3-methoxy-3-methylbutanol, 3-methoxy-3-methylbutyl acetate, coal tar naphtha, diethyleneglycol monoethyl ether, diethyleneglycol monoethyl ether acetate, diethyleneglycol monobutyl ether, triethyleneglycol monobutyl ether, triethyleneglycol monobutyl ether acetate, (meth)acrylate monomer, a vinyl ether monomer, and an amide monomer, wherein the amount of the at least one solvent having a boiling point of not less than 170° C. is not less than 70 mass % of a total weight of all solvent in the ink composition; and
   at least one thermoplastic polymer that can produce printed matter and has a weight-average molecular weight in the range of 4000 to 100,000, and a Tg (softening point) of 20 to 95° C., wherein the amount of the at least one thermoplastic polymer in the ink composition is in the range of 10 mass % to 70 mass % with respect to a total weight of the ink composition, and wherein the at least one thermoplastic polymer is selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof, wherein:
   the ink composition has:
      a viscosity of 5 to 180 Pas as measured with a BH-type rotating viscosimeter at 25° C.,
      a thixotropic index (TI value) of 2.0 to 8.0, and
      a measured flow radius value between 13.0 to 24.0 mm after 1 minute from a start of measurement by a flow property measuring method using a spread meter at 25° C. according to JIS K5701-1:2000,
   the ink composition satisfies an inequality "F60"–"F45"≤1.0 mm, wherein "F60" is defined as the measured flow radius value after 1 minute and "F45" is defined as the measured flow radius value after 45 seconds from the start of measurement by a flow property measuring method using a spread meter,
   the ink composition is adapted to produce printed matter in a single step comprising both a solid image pattern and a fine image pattern with the spreading width of no more than 10 µm from image design dimensions of a printing plate at one of edges and outlines of any section in a printed image, for avoiding a visible state of enlarged sections of the printed image and a halated printed image, when producing printed matter by screen printing onto a thermoplastic resin substrate using a 360-mesh screen printing plate formed by a high-strength, non-deforming stainless steel mesh with a filament diameter of 25 µm, the thermoplastic resin substrate being a flat base material selected from the group consisting of polycarbonate resin, treated or untreated polyester resin, acrylic resin, vinyl chloride resin, polypropylene resin, polyethylene resin, and combinations thereof, and
   the ink composition, when applied, produces a printed image coating film having an elongation percentage according to comparison between a length before shaping and a length after shaping by heating in a range between about 150° C. to 190° C. of the printed image, of not less than 250% under vacuum forming or pressure forming.

2. The ink composition for screen printing according to claim 1, wherein the weight-averaged Tg of the at least one thermoplastic polymer present in the ink composition is 45 to 90° C.

3. The ink composition for screen printing according to claim 1, wherein the thermoplastic polymer is a polyester resin.

4. The ink composition for screen printing according to claim 1, further comprising at least one of a coloring material, extender pigment and filler, or a combination thereof, that is dispersed in the ink composition with a mean particle size of not more than 35 µm.

5. The ink composition for screen printing according to claim 1, wherein the ink composition is an ink composition for graphic decorative screen printing.

6. The ink composition for screen printing according to claim 1, wherein the ink composition is an ink composition for screen printing to be used for any of black matrix, black stripe, resist pattern, spacer or light guiding panel dot formation.

7. Printed matter formed by screen printing onto a thermoplastic resin substrate using the screen printing ink composition according to claim 1.

8. A method for producing printed matter, comprising transferring the ink composition for screen printing according to claim 1 onto a thermoplastic resin substrate.

9. The ink composition for screen printing according to claim 1, wherein the ink composition is adapted to produce printed matter in a single step comprising both a solid image pattern and a fine image pattern with the spreading width of no more than 10 μm and no less than 2 μm from image design dimensions of a printing plate at one of edges and outlines of any section in a printed image, for avoiding a visible state of enlarged sections of the printed image and a halated printed image, when producing printed matter by screen printing onto a thermoplastic resin substrate using a 360-mesh screen printing plate formed by a high-strength, non-deforming stainless steel mesh with a filament diameter of 25 μm.

10. An ink composition for screen printing to be used on a thermoplastic resin substrate, the ink composition comprising:
at least one solvent having a boiling point of not less than 170° C. and that is selected from the group consisting of butylcellosolve acetate, dialkyl adipate ester, isophorone, 3-methoxy-3-methylbutanol, 3-methoxy-3-methylbutyl acetate, coal tar naphtha, diethyleneglycol monoethyl ether, diethyleneglycol monoethyl ether acetate, diethyleneglycol monobutyl ether, triethyleneglycol monobutyl ether, triethyleneglycol monobutyl ether acetate, (meth)acrylate monomer, a vinyl ether monomer, and an amide monomer, wherein the amount of the at least one solvent having a boiling point of not less than 170° C. is not less than 70 mass % of a total weight of all solvent in the ink composition;
at least one thermoplastic polymer that can produce printed matter and has a weight-average molecular weight in the range of 4000 to 100,000, and a Tg (softening point) of 20 to 95° C., wherein the amount of the at least one thermoplastic polymer in the ink composition is in the range of 10 mass % to 70 mass % with respect to a total weight of the ink composition, and wherein the at least one thermoplastic polymer is selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof; and
an extender pigment dispersed in the ink composition with a mean particle size of no greater than 35 μm in an amount in the range of 8 wt % to 30 wt % with respect to the total weight of the ink composition,
wherein:
the ink composition has:
a viscosity of 5 to 180 Pas as measured with a BH-type rotating viscosimeter at 25° C.,
a thixotropic index (TI value) of 2.0 to 8.0, and
a measured flow radius value between 13.0 to 24.0 mm after 1 minute from a start of measurement by a flow property measuring method using a spread meter at 25° C. according to JIS K5701-1:2000, the ink composition satisfies an inequality "F60"–"F45"≤1.0 mm, wherein "F60" is defined as the measured flow radius value after 1 minute and "F45" is defined as the measured flow radius value after 45 seconds from the start of measurement by a flow property measuring method using a spread meter,
the ink composition is adapted to produce printed matter in a single step comprising both a solid image pattern and a fine image pattern with the spreading width of no more than 10 μm from image design dimensions of a printing plate at one of edges and outlines of any section in a printed image, for avoiding a visible state of enlarged sections of the printed image and a halated printed image, when producing printed matter by screen printing onto a thermoplastic resin substrate using a 360-mesh screen printing plate formed by a high-strength, non-deforming stainless steel mesh with a filament diameter of 25 μm, the thermoplastic resin substrate being a flat base material selected from the group consisting of polycarbonate resin, treated or untreated polyester resin, acrylic resin, vinyl chloride resin, polypropylene resin, polyethylene resin, and combinations thereof, and
the ink composition, when applied, produces a printed image coating film having an elongation percentage according to comparison between a length before shaping and a length after shaping by heating in a range between about 150° C. to 190° C. of the printed image, of not less than 250% under vacuum forming or pressure forming.

11. An ink composition for screen printing to be used on a thermoplastic resin substrate, the ink composition comprising:
at least one solvent having a boiling point of not less than 170° C. and that is selected from the group consisting of butylcellosolve acetate, dialkyl adipate ester, isophorone, 3-methoxy-3-methylbutanol, 3-methoxy-3-methylbutyl acetate, coal tar naphtha, diethyleneglycol monoethyl ether, diethyleneglycol monoethyl ether acetate, diethyleneglycol monobutyl ether, triethyleneglycol monobutyl ether, triethyleneglycol monobutyl ether acetate, (meth)acrylate monomer, a vinyl ether monomer, and an amide monomer, wherein the amount of the at least one solvent having a boiling point of not less than 170° C. is not less than 70 mass % of a total weight of all solvent in the ink composition; and
at least one thermoplastic polymer that can produce printed matter and has a weight-average molecular weight in the range of 4000 to 100,000, and a Tg (softening point) of 20 to 95° C., wherein the amount of the at least one thermoplastic polymer in the ink composition is in the range of 10 mass % to 70 mass % with respect to a total weight of the ink composition, and wherein the at least one thermoplastic polymer is selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof, wherein:
the ink composition has:
a viscosity of 5 to 180 Pa·s as measured with a BH-type rotating viscosimeter at 25° C.,
a thixotropic index (TI value) of 2.0 to 8.0, and
a measured flow radius value between 13.0 to 24.0 mm after 1 minute from a start of measurement by a flow property measuring method using a spread meter at 25° C. according to JIS K5701-1:2000,
the ink composition satisfies an inequality "F60"−"F45"≤1.0 mm, wherein "F60" is defined as the measured flow radius value after 1 minute and "F45" is defined as the measured flow radius value after 45 seconds from the start of measurement by a flow property measuring method using a spread meter,
the ink composition is adapted to produce printed matter in a single step comprising both a solid image pattern and a fine image pattern with the spreading width of no more than 10 μm from image design dimensions of a printing plate at one of edges and outlines of any section in a printed image, for avoiding a visible state of enlarged sections of the printed image and a halated printed image, when producing printed matter by screen printing onto a thermoplastic resin substrate using a 360-mesh screen printing plate formed by a high-strength, non-deforming stainless steel mesh with a filament diameter of 25 μm, the thermoplastic resin substrate being a flat base material selected from the group consisting of polycarbonate resin, treated or untreated polyester resin, acrylic resin, vinyl chloride resin, polypropylene resin, polyethylene resin, and combinations thereof,
the ink composition does not comprise a filler having a conductive property, and
the ink composition, when applied, produces a printed image coating film having an elongation percentage according to comparison between a length before shaping and a length after shaping by heating in a range between about 150° C. to 190° C. of the printed image, of not less than 250% under vacuum forming or pressure forming.

12. An ink composition for screen printing to be used on a thermoplastic resin substrate, the ink composition comprising:
at least one solvent having a boiling point of not less than 170° C. and that is selected from the group consisting of butylcellosolve acetate, dialkyl adipate ester, isophorone, 3-methoxy-3-methylbutanol, 3-methoxy-3-methylbutyl acetate, coal tar naphtha, diethyleneglycol monoethyl ether, diethyleneglycol monoethyl ether acetate, diethyleneglycol monobutyl ether, triethyleneglycol monobutyl ether, triethyleneglycol monobutyl ether acetate, (meth)acrylate monomer, a vinyl ether monomer, and an amide monomer, wherein the amount of the at least one solvent having a boiling point of not less than 170° C. is not less than 70 mass % of a total weight of all solvent in the ink composition; and
at least one thermoplastic polymer that can produce printed matter and has a weight-average molecular weight in the range of 4000 to 100,000, and a Tg (softening point) of 20 to 95° C., wherein the amount of the at least one thermoplastic polymer in the ink composition is in the range of 10 mass % to 70 mass % with respect to a total weight of the ink composition, and wherein the at least one thermoplastic polymer is selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof,
wherein:
the ink composition has:
a viscosity of 5 to 180 Pa·s as measured with a BH-type rotating viscosimeter at 25° C.,
a thixotropic index (TI value) of 2.0 to 8.0, and
a measured flow radius value between 13.0 to 24.0 mm after 1 minute from a start of measurement by a flow property measuring method using a spread meter at 25° C. according to JIS K5701-1:2000,
the ink composition satisfies an inequality "F60"−"F45"≤1.0 mm, wherein "F60" is defined as the measured flow radius value after 1 minute and "F45" is defined as the measured flow radius value after 45 seconds from the start of measurement by a flow property measuring method using a spread meter,
the ink composition is adapted to produce printed matter in a single step comprising both a solid image pattern and a fine image pattern with the spreading width of no more than 10 μm from image design dimensions of a printing plate at one of edges and outlines of any section in a printed image, for avoiding a visible state of enlarged sections of the printed image and a halated printed image, when producing printed matter by screen printing onto a thermoplastic resin substrate using a 360-mesh screen printing plate formed by a high-strength, non-deforming stainless steel mesh with a filament diameter of 25 μm, the thermoplastic resin substrate being a flat base material selected from the group consisting of polycarbonate resin, treated or untreated polyester resin, acrylic resin, vinyl chloride resin, polypropylene resin, polyethylene resin, and combinations thereof,
the ink composition does not comprise a metal powder, and
the ink composition, when applied, produces a printed image coating film having an elongation percentage according to comparison between a length before shaping and a length after shaping by heating in a range between about 150° C. to 190° C. of the printed image, of not less than 250% under vacuum forming or pressure forming.

* * * * *